(No Model.) 3 Sheets—Sheet 1.

W. M. BROWN.
INK WELL.

No. 459,439. Patented Sept. 15, 1891.

Witnesses:
J. F. Harris.
A. M. Turner.

Inventor:
Walter Morton Brown (No Model.) 3 Sheets—Sheet 2.

W. M. BROWN.
INK WELL.

No. 459,439. Patented Sept. 15, 1891.

Witnesses:
J. F. Harris.
A. M. Turner.

Inventor:
Walter Morton Brown (No Model.)  W. M. BROWN.  3 Sheets—Sheet 3.
INK WELL.

No. 459,439.  Patented Sept. 15, 1891.

Witnesses:
J. T. Harris.
A. M. Turner.

Inventor:
Walter Morton Browne

UNITED STATES PATENT OFFICE.

WALTER MORTON BROWN, OF ALBANY, NEW YORK.

INK-WELL.

SPECIFICATION forming part of Letters Patent No. 459,439, dated September 15, 1891.

Application filed March 30, 1891. Serial No. 386,958. (No model.)

*To all whom it may concern:*

Be it known that I, WALTER MORTON BROWN, a citizen of the United States, residing at Albany, county of Albany, and State of New York, have invented certain new and useful Improvements in Ink-Wells for Desks; and I do declare the following to be a full, clear, and exact description of my invention, such as will enable others skilled in the art to which it appertains to make and use the same, reference being had to the accompanying drawings, and to the figures of reference thereon, forming part of this specification.

The object of my invention is to provide an ink-well for desks.

Figure 1:
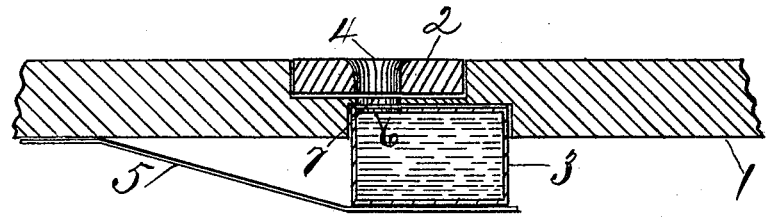
Figure 2:
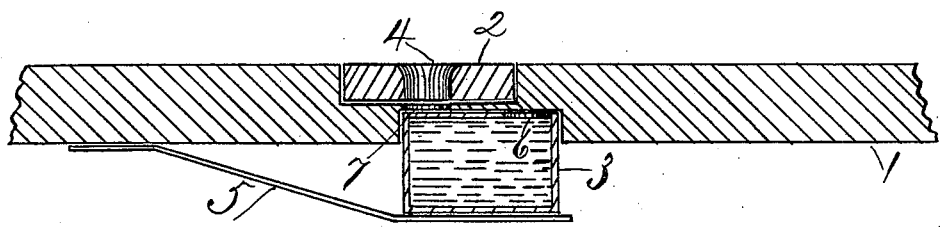
Figures 3, 4, 6:
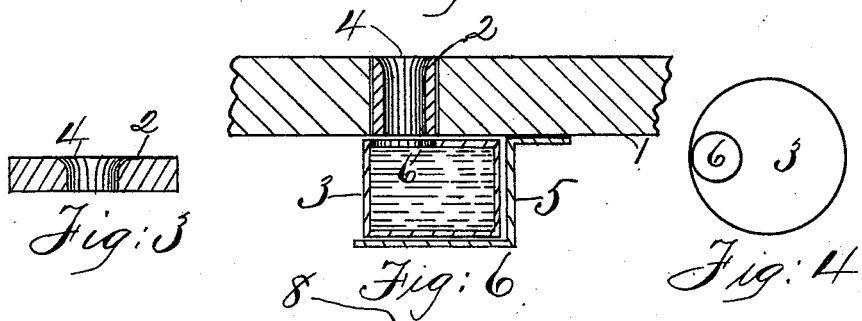
Figure 5:
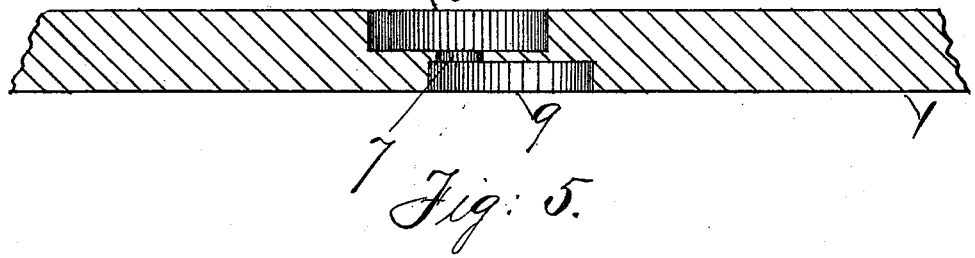
Figure 7:
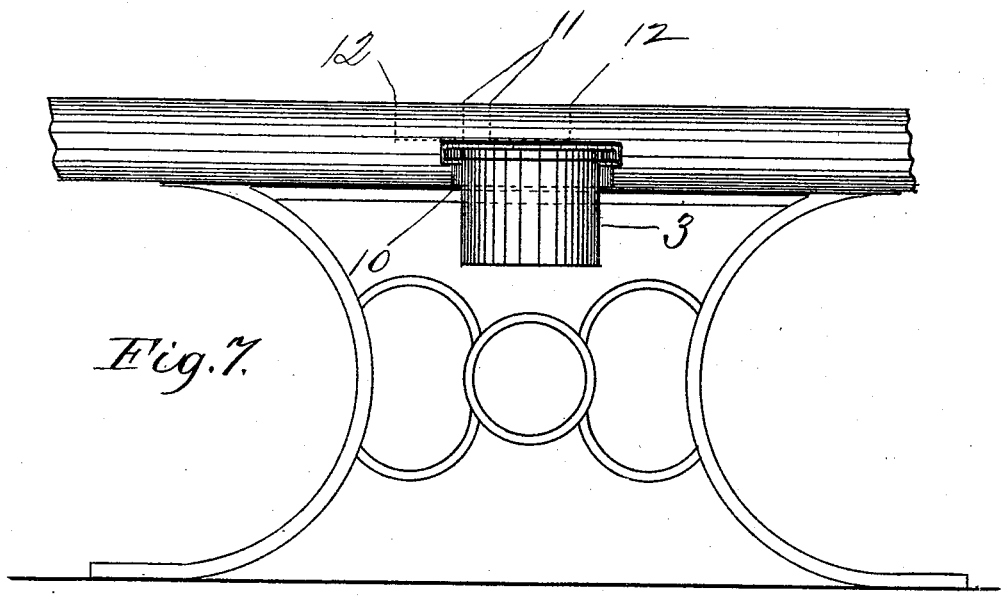
Figure 8:
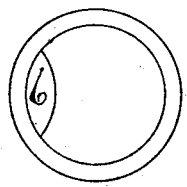
Figure 9:
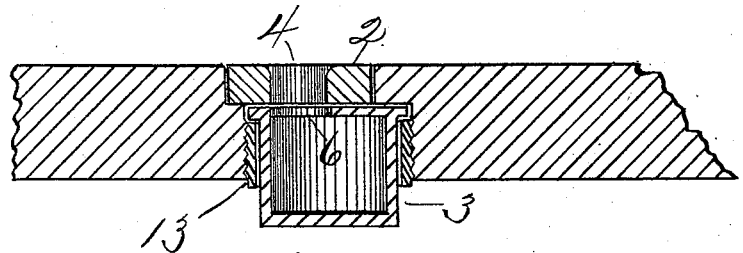
Figure 10:
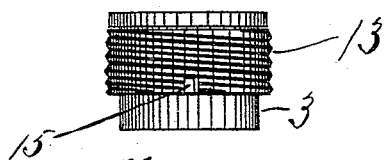
Figure 11:
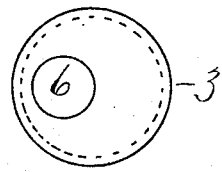
Figure 12:
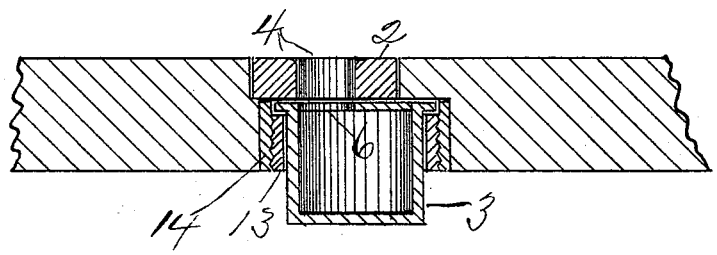

Figure 1 shows a longitudinal sectional view of a desk-top, my ink-well, and its cover, the well being open ready for use. Fig. 2 shows a similar view, the well being closed. Fig. 3 shows a vertical sectional view of my ink-well cover. Fig. 4 shows a top or plan view of the ink-well. Fig. 5 shows a longitudinal sectional view of a desk-top, showing the openings for the cover and for the ink-well. Fig. 6 shows a similar view, but showing the ink-well set on a shelf and not entering the desk-top. Fig. 7 shows an end view of a desk and its standard or legs, showing the ink-well entered in an opening in the edge of the desk-top and suspended therein by its rim and being revoluble therein, the dotted lines 12 showing the position of the ink-well cover and dotted lines 11 showing the position of the pen-hole therein. Fig. 8 shows a plan view of the ink-well shown in Fig. 7. Fig. 9 shows a longitudinal sectional view of a desk-top, my well and cover, and a threaded ring or thimble to hold the well in place. Fig. 10 shows a perspective or side view of my well and the threaded ring or thimble surrounding it. Fig. 11 shows a plan view of the ink-well shown in Fig. 9. Fig. 12 shows a similar view to Fig. 9, but shows a supplemental inner threaded ring or thimble in which the thimble 13 is entered.

The ink-well 3 has its top partly covered, leaving a pen-hole 6 in said top off the center.

The cover 2 consists, preferably, of glass or earthenware and is preferably forced into an opening in the desk-top tight enough to hold it in place; but the cover 2 may be omitted, if desired, and a simple pen-hole made through the desk-top.

An opening 9 is made in the under surface of the desk-top, as shown in Figs. 1, 2, 5, 7, 9, and 12, and said opening is made eccentric to the pen-hole 4 in the desk top or cover, so that when the well is entered in this opening 9 the pen-hole 6 in the ink-well may, by revolving the well, be turned directly under the pen-hole 4 or away from it, at pleasure. The well may, however, be set on a bracket or shelf 5, as shown in Fig. 6, or may be hung in an opening by its rim, as shown in Fig. 7, or it may be held in the opening 9 by means of a threaded ring or thimble, as shown in Figs. 9 and 12. In Figs. 1 and 2 the well is held in position by spring 5. In Fig. 7 the well 3 is held in position by being entered in an opening in the edge of the desk, its rim resting on a ledge in said opening, and the well is revoluble therein. In Figs. 9 and 12 I form a ring or thimble 13 and thread it on its outer surface, and on its bottom edge I make a notch or opening 15 and have two or more of such notches opposite each other, so that a two-bladed V-shaped screw-driver may be set astride the bottom of the ink-well, the blades entering the notches 15, so that the thimble 13 may be snugly turned either into the wood of the desk, as shown in Fig. 9, or into a supplemental inner threaded thimble 14, as shown in Fig. 12, said thimble 14 being held permanently in the opening 9 by being squeezed or pressed therein, its lower edge being preferably flush with or above the lower surface of the desk-top, and the well 6 is revoluble in the thimble 13. The opening 8, in which the cover 2 is set, is sunken just deep enough to take in the cover 2, leaving its top surface flush with the top of the desk, and the opening 9 for the well is preferably sunk into the under surface, but not deep enough to meet the opening 8, and the circular opening 7 is then made to connect the two openings; but the openings 8 and 9 may be made to meet, if desired, as shown in Figs. 9 and 12.

I do not confine myself to any particular manner of holding the well in position, as any known means may be used so long as the well is held eccentrically with the pen-hole in the desk-top and is revoluble and the pen-hole in its top arranged to be moved to and from the pen-hole in the desk-top, and I prefer to have the well revoluble; but any other motion may be imparted to it that will accomplish the same end.

The operation is as follows: The well and pen-hole being in position, the well is opened for use by revolving the ink-well until the pen-hole 6 comes directly under the pen-hole 4 in the cover, and it is closed by revolving the ink-well so that the pen-hole 6 is turned away from the pen-hole 4. The well shown in Fig. 7 revolves and operates precisely as above described; but the opening 10 is cut into the desk from the edge thereof instead of being cut in from the bottom, and the well is slid into place and hangs by a flange around its top.

What I claim is—

1. A desk having a pen-hole through its top and an ink-well held beneath said pen-hole, said ink-well having its mouth partly closed, the unclosed portion of its mouth situated off the center of said well, said well being attached to the desk and arranged to be revolved or moved so that the pen-hole therein will recede from and coincide with the pen-hole in the desk-top at will, for the purposes described.

2. A desk having a stationary pen-hole through its top and an ink-well held beneath said pen-hole, said ink-well having its mouth partly closed, leaving an opening therein for the entrance of a pen, said well being arranged to be moved so that the opening for the pen therein will recede therefrom and coincide with the pen-hole in the desk-top at will, for the purposes described.

3. An ink-well having a partly-closed mouth and an opening for a pen therein held in communication with a stationary pen-hole in a desk-top by means of a ring or thimble threaded on its outer surface, said ring or thimble being entered into an opening in the desk-top with or without a supplemental inner threaded thimble, said well being revoluble in said thimble or ring from the outside thereof, so that the pen-hole in the well may recede from or coincide with the pen-hole in the desk-top at will, for the purposes described.

In testimony whereof I affix my signature in presence of two witnesses.

WALTER MORTON BROWN.

Witnesses:
J. F. HARRIS,
A. M. TURNER.